ANALOG-DIGITAL ENCODER FOR TIME-VARYING SIGNALS

Filed Oct. 31, 1963 3 Sheets-Sheet 1

Edwin B. Neitzel
INVENTOR.

BY D. Carl Richards

Edwin B. Neitzel
INVENTOR
BY D. Carl Richards
ATTORNEY

ANALOG-DIGITAL ENCODER FOR TIME-VARYING SIGNALS

Filed Oct. 31, 1963 3 Sheets-Sheet 3

Edwin B. Neitzel
INVENTOR

BY [signature]

ATTORNEY

United States Patent Office 3,299,421
Patented Jan. 17, 1967

3,299,421

ANALOG-DIGITAL ENCODER FOR TIME-VARYING SIGNALS

Edwin B. Neitzel, Dallas, Tex., assignor to Texas Instruments Incorporated, Dallas, Tex., a corporation of Delaware

Filed Oct. 31, 1963, Ser. No. 320,571
10 Claims. (Cl. 340—347)

This invention relates to analog-to-digital conversion and in a more specific aspect to conversion into digital form of time-variable electrical analog signals as a floating point number with digital logic.

In systems where analog voltages from a given sensor must be compared with a reference voltage, it has been the practice to employ separate sources for operation of the sensor and for the comparison means. In such operations, variations in the reference voltage will cause a corresponding error in the digital representation of the analog voltage. Further, where varying signals are employed, comparison systems with limited dynamic range are often called upon to accommodate signals, the variations in which may extend beyond such range. Floating point digital operations are known to be able to accommodate signals in systems of limited dynamic range. However, in some applications, systems of the latter type are inaccurate by reason of changes occurring in the voltage to be converted during the interval required for the determination of the floating point.

The present invention is particularly applicable to conversion to digital form of analog signals produced by a variable conductance sensor or other source operating in a similar manner. It is useful in its application to the encoding of signals which may vary through a wide dynamic range over time intervals which are relatively short.

More partciularly, in accordance with the present invention, there is provided a source of analog signals and a source of independently variable reference signals against which the analog signals are to be compared. A common supply unit energizes both the source of analog signals and the source of reference signals. Means are provided responsive to a comparison operation to produce a digital representation of the analog signals.

In a further aspect of the invention, the system is provided with a variable gain amplifier which is first comparison-adjusted as to gain, following which a delayed representation of the analog signal is applied to the same amplifier for comparison to produce a digital representation of the amplitude which the analog signal exhibited at the instant the gain adjustment was undertaken.

In accordance with a further aspect of the invention, an encoder is provided which includes a bridge having a plurality of sensors forming arms of the bridge and each having an output channel. Variable impedance means form the third and fourth arms of the bridge. A common source energizes the sensors and the impedance. An amplifier is provided in a circuit leading to a threshold sensor unit with variable gain control means therein. Means are provided for making a first comparison of the analog voltage at low amplifier gain to adjust the amplifier gain. Means are then provided for later comparing the same signal at the adjusted gain level with the reference voltage and for digitally interpreting the comparison.

For a more complete understanding of the present invention and for further objects and advantages thereof, reference may now be had to the following description taken in conjunction with the accompanying drawings in which.

Figure 1:
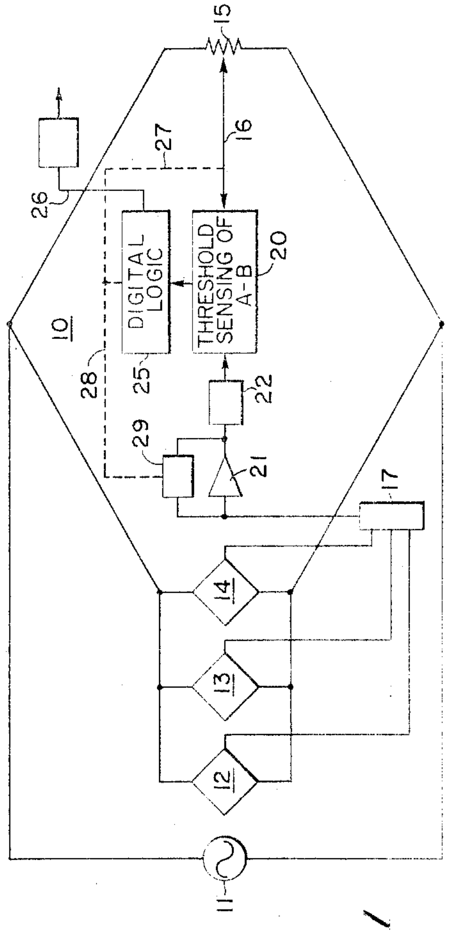
FIGURE 1 illustrates plural sensors in an analog-digital convension bridge system.

FIGURE 1 illustrates a bridge 10 with an energizing voltage applied from a source 11 to the vertical diagonal. Three condition sensing units 12, 13 and 14 are connected in parallel as to form two adjacent arms of bridge 10. A potentiometer 15, having a variable tap 16, forms the third and fourth arms of the bridge.

The output signals from sensors 12–14 are connected by way of a multiplexing unit 17 to an input channel leading to a threshold sensing unit 20 for comparing input signals applied to A and B input terminals thereof. The analog signals from sources 12–14 are applied by the multiplexer unit 17 to a variable gain amplifier 21 and thence to a sample-and-hold unit 22. The output of unit 22 is applied to terminal A of the threshold sensing unit 20. Terminal B of sensing unit 20 is connected to the tap 16 on potentiometer 15.

The output of the threshold sensing unit 20 is connected to a digital logic unit 25 which applies, to an output circuit 26, a digital representation of the signal appearing at terminal A. The unit 25 also applies a control function by way of linkage 28 to a variable gain control unit 29 of the amplifier 21. Unit 25 further applies a control function to tap 16 by way of a linkage 27 to vary the voltage applied to terminal B from potentiometer 15. The unit 25 includes a suitable clock source for control of the multiplexer 17 and the linkages 27 and 28 for sequentially applying to the threshold sensing unit 20 signals from sensors 12, 13 and 14. During the interval that any signal is applied from a sensor, the voltage is first compared in the threshold sensing unit 20 to produce a gain adjustment function on linkage 28 which is employed to set the gain of amplifier 21 to a level which will accommodate the signal to be converted. Thereafter, the same signal is compared in threshold sensing unit 20 to produce a digital output function on channel 26 representative of the sensor voltage.

The system, powered from the primary source 11, is free from error encountered in operation of systems conventional to the prior art. Since both the sensors and the potentiometer 15 are included in the bridge network, they are both subject to the same fluctuations in voltage from the source 11. By reason of this fact, errors are eliminated which otherwise would be present.

Figure 2:
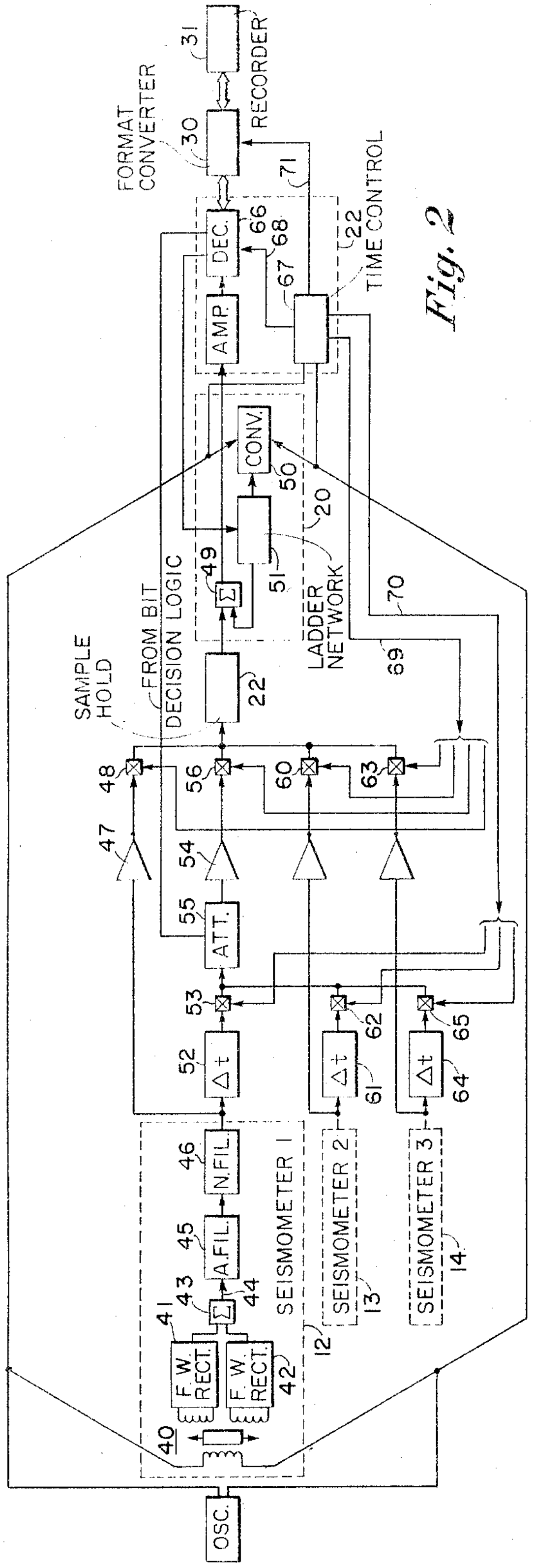
FIGURE 2 is a more detailed block diagram of a modified form of the system of FIGURE 1.

Furthermore and as shown in FIGURE 2, provision is made in the system for comparing a sensor voltage of the same magnitude both for conversion purposes and for gain adjustment. By this means, there are avoided difficulties that otherwise would be encountered if the gain of amplifier 21 were set to accommodate a time-varying voltage at a level which changes significantly during the interval required to adjust the gain.

FIGURE 2 illustrates, in block diagram form, one embodiment of the system generically represented by FIGURE 1. In this system the source 11 is a 38 kc. oscillator. The sensors 12–14 are seismometers in a three coordinate array. The output signals from the three seismometers are time-varying functions in the seismic frequency band. The signals are to be repeatedly and sequentially sampled for the production, at the output of the digital logic 20, of signals to be converted by unit 30 into digital form for recording as on a magnetic tape recorder 31.

In this embodiment, the sensor 40 is of the type manufactured and sold by International Resistance Co., 401 N. Broad Street, Philadelphia, Pennsylvania, and identified as a Differential Transformer No. IRC 70–3912. The output of the sensor 40 is applied to a pair of full wave rectifiers 41 and 42, the output of which is summed in a unit 43 to produce on an output channel 44 an analog voltage representative of the movement of the seismic mass in the differential transformer 40. The signal on channel 44 is fed through filters 45 and 46. Filter 45 is an aliasing filter as well-known in the art. Filter 46 is a low frequency band pass filter. The output of filter 46 is applied by way of a first channel including an amplifier 47 and a multiplexer switch 48 to a sample-and-hold unit 22. The threshold sensing unit 20 is connected at one input of a summing unit 49 to the output of the sample-and-hold unit 22. The second input of the summing unit 49 is supplied by a ladder network 51 which is energized by converter unit 50.

The output of filter 45 is also connected to the sample-and-hold unit 22 by way of a time delay unit 52, a multiplexing switch 53 and an amplifier 54 having a gain control unit 55. The output of amplifier 54 is connected by way of switch 56 to the sample-and-hold unit 22.

In a similar manner the sensor 13 is connected by way of a direct channel including switch 60 to the sample-and-hold unit 22. Sensor 13 is also connected by way of a delay channel including delay unit 61 and switch 62 to the input of amplifier 54.

Sensor 14 is connected by way of a direct channel including switch 63 to the input of the sample-and-hold unit 22. It is also connected by way of a delay channel including delay unit 64 and multiplex switch 65 to the input of amplifier 54.

As indicated above, the digital logic unit 20 includes a clock or time control unit 67 which, for convenience only, is energized from the source 11 in the system illustrated. Time control unit 67 controls digital logic unit 20 by way of channel 68. It also controls multiplexing switches 48, 56, 60 and 63 by way of channel 69. Further, it controls the multiplexing switches 53, 62 and 65 by way of channel 70. Finally, time control unit 67 controls the operation sequence in the converter 30 by way of channel 71.

Figure 3:
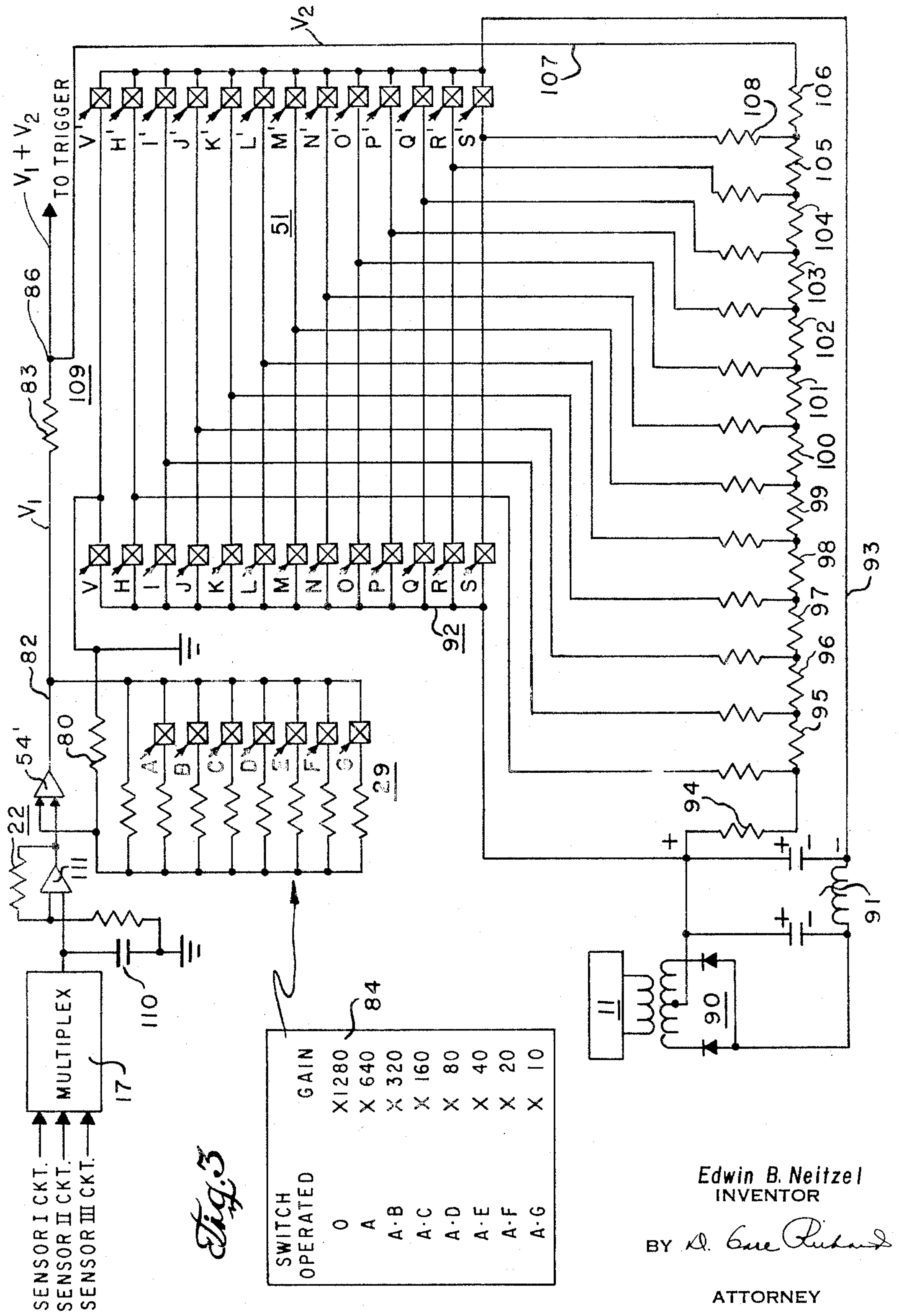
FIGURE 3 illustrates voltage ladder and summation networks of the system of FIGURE 2.

FIGURE 3 illustrates a portion of the comparison circuit of FIGURE 2. In this case, however, it will be noted that the operational amplifier 54′ is positioned in the circuit between the sample-and-hold unit 22 and the summation point. Amplifier 54′ is connected at one input by way of resistor 80 to ground and by way of a gain control network 29 to the output channel 82 which leads to summing resistor 83. The unit 29 includes a plurality of resistors connected in parallel through switches A–G. When the swtiches are enabled, the gain of amplifier 54′ is selectively changed in accordance with schedule 84. A second input of amplifier 54′ is connected to the output of the sample-and-hold unit 22. A summation point 86 at one terminal of resistor 83 presents the sum of two voltages, one from a sensor selected by the multiplexer unit 29 and the other from the ladder 51. The ladder 51 is energized from source 11 by way of a full wave rectifier 90. The output circuit of the rectifier 90 includes a filter 91. Thus, the reference voltage source for the ladder 51 has its positive terminal connected to bus 92 and its negative terminal connected to bus 93. Bus 92 is connected by way of a series of resistors 94–106 and line 107 to the summation point 86. The junctures between adjacent ones of resistors 94–106 are connected into a switching unit connected between bus 92 and bus 93. When switch V is closed, the bus 90 is connected to ground at the lower end of resistor 80. If switches S′–H′ are then successively closed, the voltage on line 107 will vary from a negative maximum to a minimum level for comparison with the voltage from amplifier 54′. On the other hand, when the switch V′ is closed, the negative bus 93 is grounded. Upon successive closure of switches H–S, the voltage on line 107 will vary from a positive maximum to a minimum level. The voltages selectively applied from the ladder network to point 86 may thus be controlled by the closure of switches H–S.

The switches H–S preferably are of semiconductor type, actuated under the control of programmed logic in unit 20 for comparison of the voltage from the ladder network with the voltage from the sample-and-hold unit 22. The operation is programmed in unit 20 such that, with polarity determined, the most significant bit is first sampled. Assume switches V′ and S are closed. If the voltage on the output line 107 is lower than the voltage from amplifier 54′, then the first bit is left in a one-state, and then switch R is closed. If the voltage on bus 107 is larger than the voltage from amplifier 54′, then the second bit is reset to zero, the switch R is opened and the switch Q is then closed.

Such a sequence is continued, as known in the art, throughout the switching bank 109 until the least significant bit in the system has been set.

The magnitude of voltages derived from the ladder network 51 may be changed in increments dependent upon the combination of switches H–S enabled for a given comparison. The basis of the word length, and thus the number of switching points on the ladder, is determined by the accuracy required. In the present system, the word length is 13 bits with one bit allowed for sign. In addition, two bits for control and timing purposes make up a total word length of 16 bits.

In accordance with the present invention, the multiplexed signals on channels 69 and 70 are so controlled as to first cause switch 48, FIGURE 2, to apply a signal from sensor 12 to the sample-and-hold unit 22. During a predetermined time interval thereafter, the voltage applied to the summation unit 49 is evaluated and is controlled by adjusting the gain of the amplifier 54 to bring the analog signal as applied to the summation unit 49 into the range accommodated by the converter system. Thereafter, the switch 48 is opened and switches 53 and 56 are closed. The delay in the unit 52 is set to be equal to the time required to set the gain of amplifier 54. Thus, there is applied to the sample-and-hold unit 22 an analog voltage proportional in magnitude to the voltage previously employed for setting the gain, and related to that voltage as having occurred at the same instant of time but delayed in unit 52 in order to accommodate gain adjustment. This permits the production in the read-out system of a floating point digital representation of a time-varying sensor voltage through use of automatic scale switching in the unit 29 of FIGURE 3.

In the specific embodiment illustrated, oscillator 11, operating at 38 kc., is employed to drive the primary winding of the differential transformer 40 in each of the three sensors 12, 13 and 14. The same 38 kc. signal is converted in unit 50 to provide the reference source for the analog-to-digital converter. The outputs from the differential transformers in units 12, 13 and 14 are bridge-rectified and summed. The analog voltage thus produced passes through appropriate filters 45 and 46.

In order to provide a large enough, least-significant input voltage for measurement with the converter system, the operational amplifier 54 is employed. The sensor outputs are multiplexed into the converter system at a 30 cycles per second rate. The information required for adjusting amplifier gain is obtained by an analog-to-digital conversion first-look at the input voltage on the sample-and-hold unit 22 with the system set at low-gain. The low-gain voltage is switched directly into the sample-and-hold unit and an analog-to-digital conversion is performed. The product or output of the first-look conversion provides the necessary information for setting the appropriate scale switches such as in the unit 29 of FIGURE 3. The seven switches A–G initially are enabled simultaneously. The switches A–G are then disabled in dependence upon the analog signal to set the gain at the desired level.

Thus the present method of analog-to-digital conversion provides for resolution that is dependent upon the amplitude of the signal. For example, a single binary bit may be equivalent to 0.5 millimicron displacement of the unit 12 at the lowest scale setting of the unit 29, and equivalent to 500 millimicrons for the highest scale setting.

The filter 45 is an M-derived low-pass filter with a cut-off of 10 cycles per second and has an input impedance matched to the output of the rectifier-summing unit 41–43. The filter 46 is a variable, twin-T notch filter adjustable from 0.16 to 10 cycles per second with a maximum attenuation of approximately 50 db.

Binary gain steps are obtained for the amplifier 54' by the feed-back resistors in the switching unit 29. In order to avoid noise in the input of the amplifier 54', mercury contact or reed relay switches are employed. As indicated in table 84, the total gain range is from 10 to 1280 in binary steps under the control of the digital logic as indicated by the arrows on switches A–G. The sample-and-hold circuit 22 holds the sample data on capacitor 110 for the time required for analog-to-digital conversion. With the multiplexing switch 48 closed, the sample-and-hold capacitor 110 will charge rapidly due to the low driving circuit impedance. However, when the switch 48 is opened, the time constant for the circuit is of the order of 25 seconds or more, due to the very high amplifier input impedance. The sample-and-hold circuit is actuated twice during each cycle, once for determination of the pre-amplifier gain setting and a second time for the analog-to-digital conversion through operation of the ladder network of FIGURE 3.

The amplifier 111 of the sample-and-hold unit may be a Philbrick amplifier P2 and of the type manufactured and sold by Geo. A. Philbrick Researches, Inc., 127 Clarendon St., Boston 16, Massachusetts.

Figure 4:
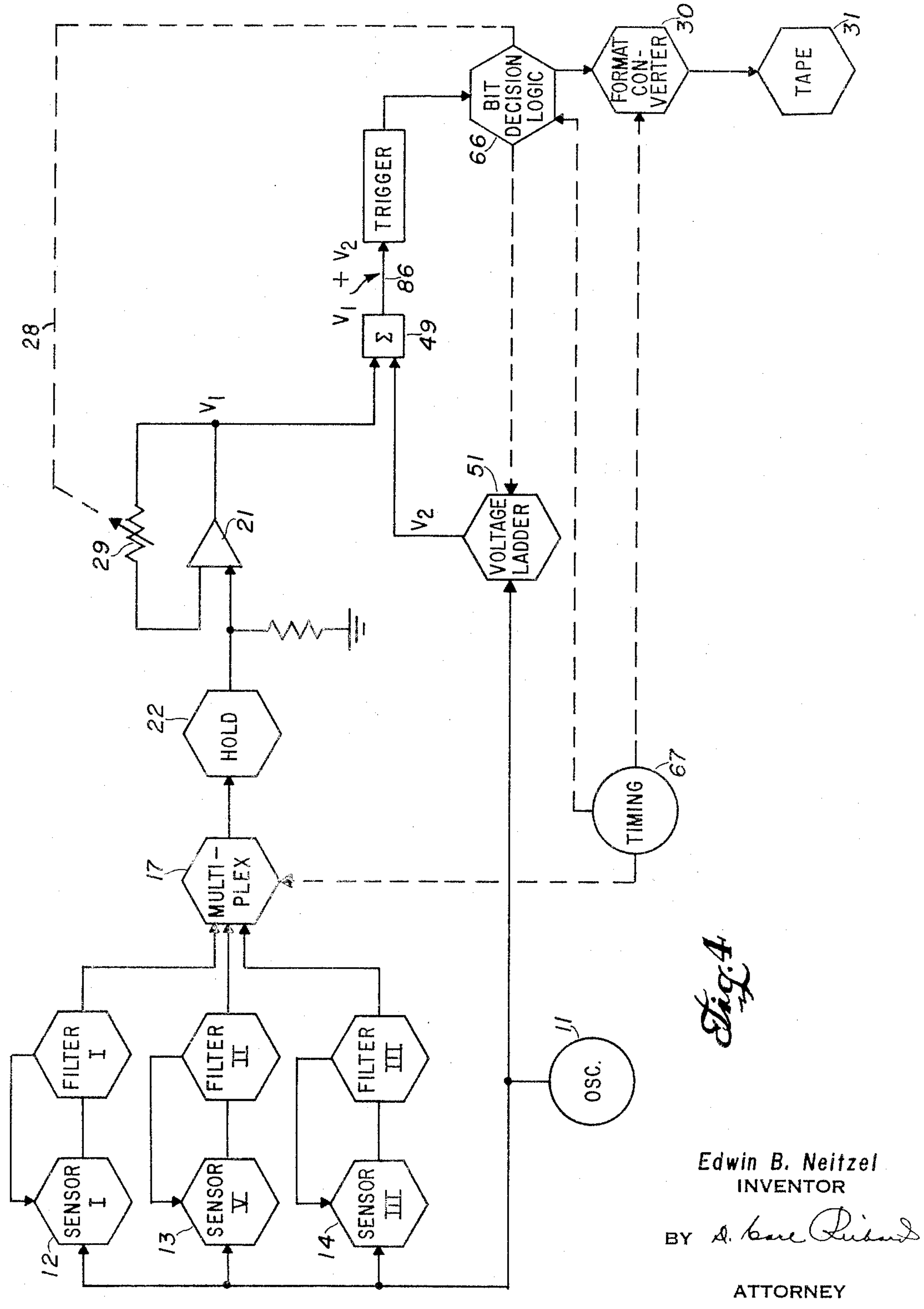
FIGURE 4 is a flow diagram of the system of FIGURE 2.

FIGURE 4 illustrates the functional transfer of data and the generalized control for the digital conversion bridge. The following step-by-step sequence is cyclically employed:

(1) The multiplexer 17 selects the output of a given sensor and stores its amplitude in the sample-and-hold circuit 22.

(2) The operational amplifier 21 is set for minimum gain and its output is compared with the output of the voltage ladder 51. The reference voltage for the voltage ladder is provided by the same source 11 that drives the sensors 12, 13 and 14.

(3) The bit decision logic 66 adjusts the voltage ladder until a null is obtained at the summation point 86 from the summation unit 49.

(4) The state of the bit decision logic 66 is transferred to the gain adjustment unit 29 on the amplifier 21 by the linkage 28 and a new gain is selected.

(5) The voltage ladder 51 is again adjusted by the bit decision logic 66 until a null is obtained.

(6) The timing control 67 transfers the digital state of the bit decision logic and the gain setting of the amplifier 21 to the format converter 30.

(7) The format converter 30 under control of the timing circuit 67 transfers the data, with the correct format to the tape unit 31.

(8) The multiplexer 17 selects the next sensor and the process is repeated.

In a preferred embodiment the multiplexer 17 is comprised of reed relays controlled by the timing circuit 67.

The switches in the unit 109 have been shown in diagrammatic form since they are of the type well-known in the art. For example, the gates may be of the type illustrated and described in Handbook of Automation, Computation and Control, volume 3, by Grabbe et al., 1961, in Figure 95 at pages 27–89. Switches of this general type are manufactured and sold by National Semiconductor Corp., Danbury, Connecticut, and identified as Model No. NS 3001. The normal one-half approximation method of analog-to-digital conversion is known in the art and described in Notes on Analog-Digital Conversion Techniques by Alfred K. Susskind, 1957, John Wiley & Sons.

In the present invention, however, the sensor is employed in a bridge network such that the minor fluctuations normally encountered in supply voltages are compensated and do not introduce errors into the measurement. The system may therefore be employed to digitize a plurality of analog voltages or a single analog voltage by selecting successive time-spaced samples and adjusting the magnitude of each sample by a first comparison with a selectively variable reference voltage. A later comparison is made between the same sample, adjusted in magnitude, and a reference voltage. A digital representation of the comparison is then generated.

While the foregoing has related to a converter system in which seismometers were employed for production of an analog signal, it will be readily recognized that different forms of sensors may be employed and that the number may be greater or less than the three employed in the example above described. Temperature, strain, acceleration, displacement, pressure, capacity, inductance and resistance all are measurable in accordance with the invention. Still other measurements may be made. For example, a given sensor could be converted to the equivalent of a variable conductance, even though the given sensor is not of this type.

Having described the invention in connection with certain specific embodiments thereof, it is to be understood that further modifications may now suggest themselves to those skilled in the art and it is intended to cover such modifications as fall within the scope of the appended claims.

What is claimed is:

1. An encoder for digitizing a time-variable analog signal which comprises:

(a) an analog signal source having an energizing circuit and producing on its output channel an analog signal, the magnitude of which at least in part is dependent upon the energization of said source, (b) an impedance means connected in parallel to said energizing circuit and having a variable tap thereon for production of a selectively variable reference voltage, (c) an energizing means connected in parallel with said impedance means and said source to form a bridge network in which said source forms two adjacent arms and said impedance means forms two adjacent arms, (d) means for sequentially storing a direct function and a delayed function of each of a plurality of time-spaced samples of said signal, (e) digital logic means for comparing each direct function with said reference voltage held at a predetermined level to adjust the amplitude of the delayed function to a level compatible with said reference voltage, (f) digital logic means for comparing each delayed function, adjusted in amplitude, by varying said reference voltage to sense the level of the adjusted delayed function, and (g) means for producing digital representations of the adjustment in magnitude of said delayed function and of the variations in said reference voltage.

2. An encoder for digitizing a time-variable analog signal which comprises:

(a) an analog signal source having an energizing circuit and producing on its output channel an analog signal, the magnitude of which at least in part is dependent upon the energization of said source, (b) impedance means connected in parallel with said energizing circuit and having a variable tap thereon, (c) an energizing means connected in parallel with said impedance means and said source to form a bridge network in which said source forms two adjacent arms and said impedance means forms two adjacent arms, and (d) digital logic means for comparing time-spaced samples of said analog signal with the voltage at said tap to produce digital representations of said analog signal independent of variations in said energizing means.

3. An encoder for digitizing time-variable analog signals which comprises:

(a) a plurality of analog voltage sources each having an energizing circuit and each producing on its output channel an analog voltage, the magnitude of which at least in part is dependent upon the energization of the source, (b) impedance means connected in parallel with the energizing circuits of said sources and having a variable tap thereon, (c) an energizing means connected in parallel with said impedance means and said sources to form a bridge network in which said sources form two adjacent arms and said impedance means forms two adjacent arms, (d) a multiplexer for cyclically sampling the voltages on the output channels of said sources, and (e) digital logic means for comparing the output of said multiplexer with the voltage at said tap to produce digital representations of said output independent of variations in said energizing means.

4. An encoder for digitizing time-variable analog signals which comprises:

(a) a plurality of analog voltage sources each having an energizing circuit and each producing on its output channel an analog voltage, the magnitude of which at least in part is dependent upon the energization of the source, (b) impedance means connected in parallel with the energizing circuits of said sources and having a variable tap thereon, (c) an energizing means connected in parallel with said impedance means and said sources to form a bridge network in which said sources form two adjacent arms and said impedance means forms two adjacent arms, (d) a multiplexer connected to the output channels of said sources, (e) digital logic means for comparing the successive outputs of said multiplexer with the voltage at said tap in repeated one-half approximation sequences to produce digital representations of said outputs independent of variations in said energizing means, and (f) timing means for control of said digital logic means and said multiplexer cyclically to scan and present to said digital logic means time-spaced samples of the signals on said output channels.

5. An encoder for digitizing time-variable analog signals which comprises:

(a) an analog signal source having an energizing circuit and producing on its output channel an analog signal, the magnitude of which at least in part is dependent upon the energization of said source, (b) an impedance means connected in parallel to said energizing circuit and having a variable tap thereon for production of a selectively variable reference voltage, (c) an energizing means connected in parallel with said impedance means and said source to form a bridge network in which said source forms two adjacent arms and said impedance means forms two adjacent arms, (d) means for sequentially storing a direct function and a delayed function of each of a plurality of time-spaced samples of said signal, and (e) digital logic means for comparing each direct function with said reference voltage to adjust the amplitude of the delayed function and for comparing the delayed function, adjusted in amplitude, with said reference voltage.

6. An encoder for digitizing a time-variable analog signal which comprises:

(a) an analog signal source having an energizing circuit and producing on its output channel an analog signal, the magnitude of which at least in part is dependent upon the energization of said source, (b) an impedance means connected in parallel to said energizing circuit and having a variable tap thereon for production of a selectively variable reference voltage, (c) an energizing means connected in parallel with said impedance means and said source to form a bridge network in which said source forms two adjacent arms and said impedance means forms two adjacent arms, (d) means for sequentially storing a direct function and a delayed function of each of a plurality of time-spaced samples of said signal, (e) digital logic means for comparing each direct function with said reference voltage to adjust the amplitude of the delayed function and for comparing the delayed function, adjusted in amplitude, with said reference voltage, and (f) means for generating digital representations of the comparison for each of said samples.

7. In a system for one-half approximation analog-to-digital conversion, the combination which comprises:

(a) a digital logic unit having a threshold comparison means with two input channels, (b) a first circuit connected to the first of said input channels including a voltage ladder network with selectively operable switching means to vary in predetermined steps a reference voltage on said first input channel, (c) a second circuit leading to the second of said input channels having a signal amplifier, a direct signal branch and a delay signal branch, (d) means responsive to said logic unit to adjust the gain of said amplifier in response to a first comparison between the signal from said direct branch and said reference voltage held at a fixed level and for thereafter establishing a second comparison between the signal from said delay branch by actuating said ladder network to vary said reference voltage to the level of the delayed signal, and (e) means for generating digital representations of both comparisons.

8. A system for conversion of a time-varying analog signal to digital form which comprises:

(a) means for selecting successive time-spaced samples of said signal, (b) comparison means, including a selectively variable reference voltage, for adjusting the magnitude of each sample, (c) means for thereafter controlling said comparison means to compare the same sample adjusted in magnitude with said reference voltage, and (d) means for generating a digital representation of variations in said reference voltage during the latter comparison.

9. A system for conversion of time-varying analog signals to digital form which comprises:

(a) means for cyclically storing successive time-spaced samples of said analog signals, (b) comparison means, including a selectively variable source of a reference voltage, for adjusting the magnitude of each stored sample, (c) means for thereafter controlling said comparison means to compare each sample adjusted in magnitude with said reference voltage, and (d) means for generating digital representations of variations in said reference voltage during the latter comparison.

10. In a system for one-half approximation analog-to-digital conversion, the combination which comprises:

(a) a digital logic unit having a threshold comparison means with two input channels, (b) a first circuit connected to the first of said input channels including a voltage ladder network with selectively operable switching means to vary a reference voltage applied to the first input channel in predetermined steps, (c) a second circuit leading to the second of said input channels having a signal amplifier with a step-wise gain adjustment means therein, a direct signal branch and a delay signal branch, (d) means responsive to said logic unit to actuate said gain adjustment means in response to a first comparison between the signal from said direct branch and said reference voltage held at a fixed level and for thereafter establishing a second comparison between the signal from said delay branch by actuating said ladder network to vary said reference voltage to the level of the delayed signal, and (e) means for generating digital representations of both comparisons.

References Cited by the Examiner

UNITED STATES PATENTS

| | | | |
|---|---|---|---|
| 3,027,079 | 3/1962 | Fletcher et al. | 235—154 |
| 3,051,901 | 8/1962 | Yaeger | 325—38 |

DARYL W. COOK, *Acting Primary Examiner.*

A. L. NEWMAN, *Assistant Examiner.*